Figure 1:
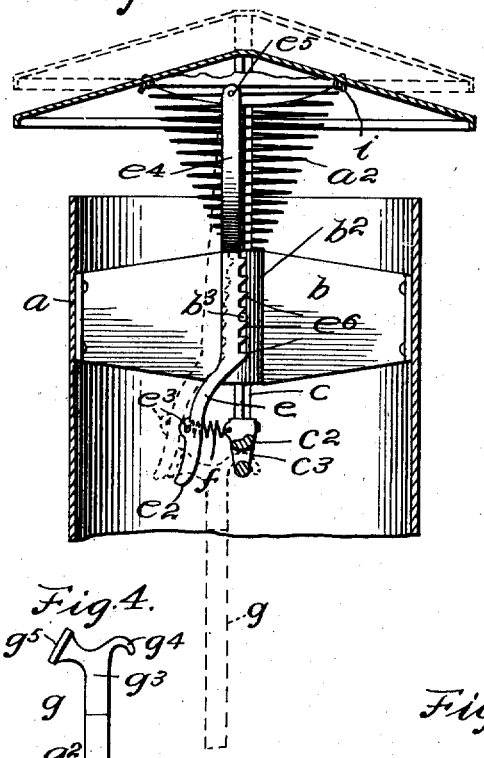

W. J. LINDEMEYER.

VENTILATOR.

APPLICATION FILED JAN. 11, 1911.

Reissued May 9, 1911.

13,239.

2 SHEETS—SHEET 1.

WITNESSES

E. G. Bromley.

C. E. Mulreany.

INVENTOR

WILLIAM J. LINDEMEYER.

BY Edgar Tate & Co.

ATTORNEYS.

THE NORRIS PETERS CO., WASHINGTON, D. C.

W. J. LINDEMEYER.

VENTILATOR.

APPLICATION FILED JAN. 11, 1911.

Reissued May 9, 1911.

13,239.

2 SHEETS—SHEET 2.

WITNESSES

E. G. Bromley,

L. E. Quelreamy

INVENTOR

WILLIAM J. LINDEMEYER.

BY Edgar Tate & Co.

ATTORNEYS.

THE NORRIS PETERS CO., WASHINGTON, D. C.

UNITED STATES PATENT OFFICE.

WILLIAM J. LINDEMEYER, OF STAPLETON, NEW YORK.

VENTILATOR.

13,239. Specification of Reissued Letters Patent. Reissued May 9, 1911.

Original No. 978,175, dated December 13, 1910, Serial No. 556,065. Application for reissue filed January 11, 1911. Serial No. 602,115.

*To all whom it may concern:*

Be it known that I, WILLIAM J. LINDEMEYER, a citizen of the United States, and residing at Stapleton, Staten Island, in the county of Richmond and State of New York, have invented certain new and useful Improvements in Ventilators, of which the following is a specification, such as will enable those skilled in the art to which it appertains to make and use the same.

This invention relates to devices or apparatus for ventilating buildings of various kinds and classes, and the object thereof is to provide an improved device of this class which is simple in construction, practical and efficient in operation, and which may be applied wherever devices of this class are required.

The invention consists of a suitable flue or tube in which is placed a transverse support above which is a spring supported hood and means for lowering said hood and securing it in any desired position for adjustment so as to control the passage of air through the flue or tube, and particularly of the details of construction hereinafter described and claimed and by which said hood is supported and may be adjusted into different position.

The invention is fully disclosed in the following specification, of which the accompanying drawing forms a part, in which the separate parts of my improvement are designated by suitable reference characters in each of the views, and in which:—

Figure 2:
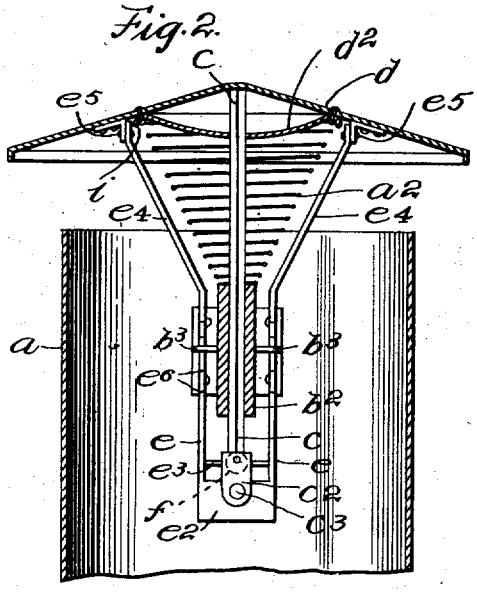
Figure 4:
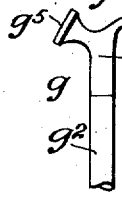
Figure 3:
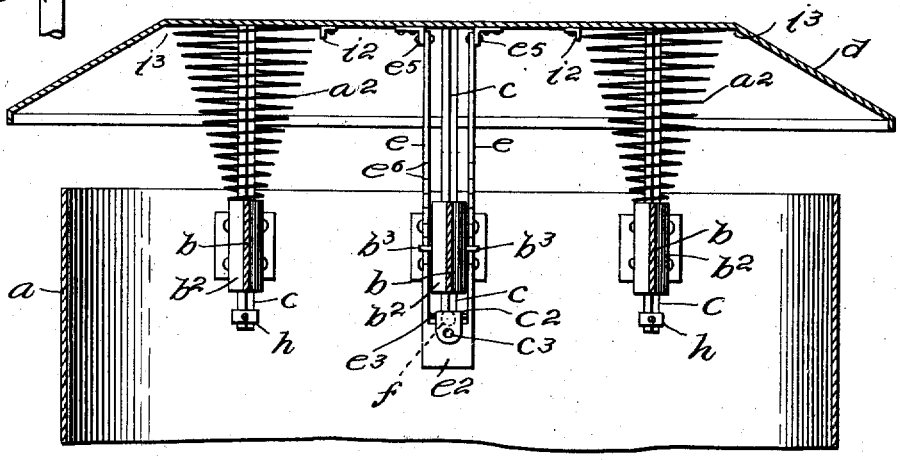
Figure 5:
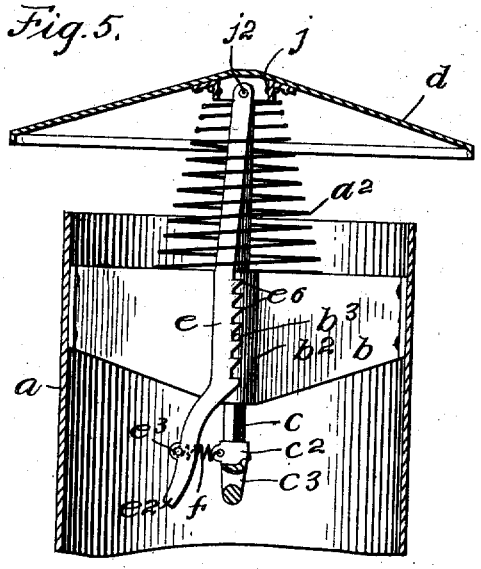

Figure 1 is a sectional side view of my improved ventilating device; Fig. 2 a view similar to Fig. 1, but at right angles thereto; Fig. 3 a view similar to Fig. 2 but showing a modification; Fig. 4 a side view of a tool or implement used in adjusting the hood of the ventilator and the use of which is indicated in dotted lines in Fig. 1; Fig. 5 a view similar to Fig. 1 showing another modification, and Fig. 6 a view similar to Fig. 2 of the construction shown in Fig. 5.

In the drawing forming part of this specification, I have shown at $a$ a ventilating tube or flue which may be placed at any point in the roof of a building and which may be either round, square or oblong in cross section as indicated in Fig. 3.

In the practice of my invention as shown in Figs. 1 and 2, I secure in the top portion of the tube or flue $a$ a cross member or support $b$ having a central vertically arranged guide $b^2$ through which is passed a vertically movable shaft $c$, with the top of which is connected a hood $d$ which is preferably conical in form. And to the under side and central portion of this hood is secured, in the construction shown, a concavo-convex disk $d^2$ through which the shaft $c$ passes. The shaft $c$ is preferably made angular in cross section and the central bore of the guide $b^2$ through which the said shaft passes is correspondingly formed so as to prevent the rotation of said shaft in said guide. Placed between the hood $d$ and the support $b$ is a spiral spring $a^2$ which normally holds said hood in its highest position and this spring is preferably made in the form of a cone, the apex of which extends downwardly and rests upon the support $b$. The lower end of the shaft $c$ is provided in the form of construction shown with a head $c^2$ having an aperture $c^3$. The support $b$ which is arranged vertically is provided at its opposite sides with laterally directed pins or stops $b^3$. I also provide a yoke-shaped lock device $e$, the side arms of which are parallel at their lower ends and connected by an offset cross head $e^2$ above which is placed a transverse pin $e^3$. The upper end portions of the side arms of the yoke-shaped device $e$ diverge in this form of construction as shown at $e^4$ and are pivoted to the hood $d$ at $e^5$. The head $c^2$ at the lower end of the shaft $c$ and the pin $e^3$ in the lower end portion of the yoke-shaped device $e$ are connected by a spring $f$ and the parallel lower end portions of the side arms of the yoke-shaped device $e$ are provided with teeth $e^6$ which are adapted to engage the stop pins $b^3$ and hold the hood $d$ in any desired position of adjustment.

It will be understood that devices of this class are usually placed in such position overhead that an implement of some kind is necessary in order to operate the hood $d$ or lower it. For this purpose I provide a tool or implement $g$ shown in Fig. 4 and in dotted lines in Fig. 1, and said tool or implement comprises a suitable handle $g^2$ having a head $g^3$ at one side of which is a hook $g^4$ and at the opposite side of which is a nose piece $g^5$.

Whenever it is desired to lower the hood $d$ of the ventilator the tool or implement $g$ is manipulated so as to pass the hook $g^4$ through the aperture $c^3$ in the head $c^2$ of the shaft $c$, when a pull on the tool or implement $g$ will draw down the shaft $c$. In this operation the teeth $e^6$ on the side arms of the yoke-shaped device $e$ will pass over the stop pins $b^3$ under the control of the spring $f$ as will be readily understood, and when the hood $d$ has been drawn down to the desired point of adjustment the teeth $e^6$ engaging the stop pins $b^3$ will hold said hood in said position. Whenever it is desired to raise the hood $d$ the tool or implement $g$ is manipulated so as to pass the hook $g^4$ through the aperture $c^3$ in the head $c^2$ of the shaft $c$, after which said tool or implement is manipulated so as to force the nose $g^5$ thereof against the head $e^2$ of the yoke-shaped device $e$ and force the lower end of said device outwardly as shown in dotted lines in Fig. 1, so that the teeth $e^6$ will be disengaged from the stops or pins $b^3$, at which time the spring $a^2$ will raise said hood. When the said hood has been raised to the desired point the tool or implement $g$ is manipulated so as to allow the spring $f$ to operate. In this way, the hood $d$, as will be understood, may be adjusted into any desired position and the flow of air through the flue or conduit $a$ may thus be regulated.

In Fig. 3, I have shown a modification in which the tube or conduit $a$ is enlarged so as to increase the dimensions thereof, and in this form of construction in order to steady the hood $d$ which is correspondingly enlarged I employ a plurality of suitably spaced transverse supports $b$, shafts $c$ and springs $a^2$, the lower ends of the two outer shafts $c$ being provided only with stops, heads or collars $h$ which limit the upward movement of said shafts. In connection with these parts I employ a central support $b$, a central shaft $c$, a yoke-shaped attachment $e$, said parts being similar in all respects to those shown in Figs. 1 and 2. In this form of construction the hood $d$ is normally held in its highest position by the springs $a^2$. In order to lower said hood, the tool $g$ is manipulated in connection with the head $c^2$ of the central shaft $c$, so as to pull down said hood, and said tool is manipulated in connection with the head $c^2$ of the shaft $c$, and the head $e^2$ of the yoke-shaped attachment $e$, so as to disconnect the teeth $e^6$ on the side arms of said attachment from the stop pins $b^3$ in order that the springs $a^2$ may raise the hood. It is to be understood that the spring $f$ is also employed in connection with the yoke-shaped attachment $e$, and the head $c^2$ of the shaft $c$ in the construction shown in Fig. 3, and as indicated in dotted lines in said figure, the same as with the construction shown in Figs. 1 and 2.

In the construction shown in Fig. 3 the side arms of the yoke-shaped attachment $e$ are made parallel throughout their length and no spring $a^2$ is employed in connection with said attachment and the corresponding support $b$, as two of the springs $a^2$ will be sufficient under most conditions, but it will be understood that a spring $a^2$ may be employed in connection with the central keeper $b$, the corresponding shaft $c$ and yoke-shaped device $e$, if desired, and other changes in and modifications of the construction hereinafter described may be made within the scope of the appended claims, without departing from the spirit of my invention or sacrificing its advantages.

In the construction shown in Figs. 1 and 2 the concavo-convex disk $d^2$ is provided with a depending flange or rim $i$ within which the spring $a^2$ fits and which serves to hold the larger end of said spring in proper position, while in the construction shown in Fig. 3 stops $i^2$ are secured to the hood $d$ for a similar purpose, said stops serving in connection with the angle at $i^3$ in the hood $d$ formed by the depending flange or rim of said hood.

Figure 6:
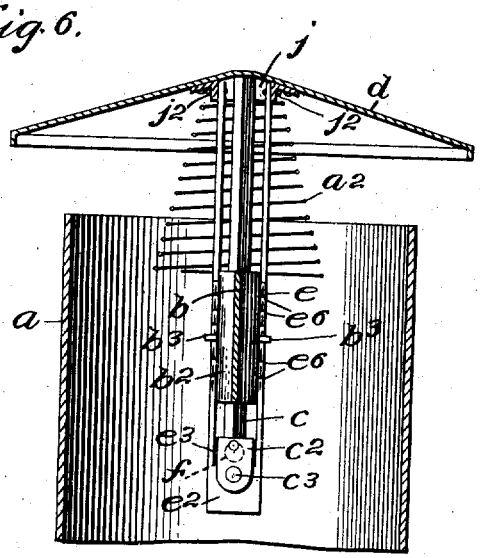

In Figs. 5 and 6, I have shown another modification in which the support $b$, the vertical movable shaft $c$, the spring $a^2$, the hood $d$ and the locking device $e$ are all employed together with the spring $f$, all of these parts being of the same form and construction as in Figs. 1 and 2 with the exception that the spring $a^2$ is inverted, the base portion thereof resting on the support $b$ and the apex thereof inclosing a tubular member $j$ secured centrally to one side of the hood $d$. The tubular member $j$ serves to hold the spring $a^2$ in proper position and in this form of construction the sides of the yoke-shaped locking device $e$ are parallel throughout and are passed up through the spring $a^2$ and are pivoted to the tubular member $j$ as shown at $j^2$, and the operation of the construction shown in Figs. 5 and 6, will be the same as of that shown in Figs. 1 and 2.

Although I have described the construction shown in Figs. 5 and 6 as a modification, this form of a device may be preferred in some cases and especially where the tube, flue or casing $a$ is small.

In all the forms of construction the spring $a^2$ is conical in form, this shape of said spring being preferred in order that the separate coils thereof when the spring is compressed will fold one within another and enable the hood $d$ to be drawn down close to the top of the tube, flue or casing *a* when the support *b* is located at or near the top thereof, but my invention is not limited to this shape or form of said spring nor, in fact, to any spring, and other means may be employed for accomplishing the same result.

Having fully described my invention, what I claim as new and desire to secure by Letters Patent, is:—

1. In a ventilating device of the class described, a flue, tube or casing, a transverse support mounted in the top portion thereof and provided with a central vertically arranged guide, a shaft mounted in and vertically movable in said guide, a hood connected with the upper end of said shaft, a locking device pivotally suspended from said hood and provided with teeth adapted to engage stops on the sides of said support, a tension device connecting the lower end of said shaft and the lower end of said locking device and tension means holding said hood in an elevated position.

2. A ventilating device of the class described, comprising a tube, flue or casing in which is placed a transverse support provided with a central vertical guide, a vertically movable shaft passing through said guide, a hood connected with the upper end of said shaft, a spring placed between said hood and said support and normally serving to hold said hood in its highest position, a yoke-shaped locking device pivotally suspended from said hood and the side arms of which are provided with ratchet teeth adapted to engage stops connected with said support, a tension device connecting the lower end of said shaft and the lower end portion of said yoke-shaped locking device.

3. A ventilating device of the class described, comprising a tube, flue or casing, a transverse support secured therein and provided with a central vertically arranged guide, a shaft vertically movable through said guide, a hood connected with the upper end of said shaft, a spring placed between said hood and said support, a lock device pivotally suspended from said hood and provided with teeth adapted to engage stops on said support and a tension device connecting the lower end of said shaft with said lock device.

4. In a ventilating device of the class described, a support adapted to be secured transversely in a tube flue or casing and provided with a vertically disposed guide, a shaft movable vertically in said guide, a hood connected to the upper end of said shaft, a depending locking device connected with said hood and adapted to engage said support at different points and an elastic means connecting the lower end of the said locking device and the lower end of said shaft.

5. In a device of the class described, a flue, tube or casing, a support mounted transversely therein, a hood, supporting means for said hood connected with said transverse support to permit the raising and lowering of the hood, automatic means for raising said hood, and a locking device having a pivotal connection with said movable parts, and extending downwardly below the said transverse support, the said locking device and transverse support constructed to permit the engagement of the two to hold the hood at the desired point of elevation.

6. In an apparatus of the class described, a casing having a transverse support, a vertically movable member having a sliding connection with said support and extending above and below the same, a hood connected with the top of the vertically movable member, means normally tending to force said member upwardly and hold it in a raised position, and a locking device having a pivotal connection with the movable parts and extending below said support, said locking device and said support being provided with parts which are adapted to engage and to hold said member and said hood in different positions.

7. An apparatus of the class described, comprising a casing having a transverse support therein, a vertically movable member having a slidable connection with said support and extending above and below the same, a hood mounted on said member above said casing, means for normally forcing said member and said hood upwardly and for holding them in a raised position, and a locking device pivoted to said movable parts and extending below said support, said support being provided with pins and the locking device with teeth to engage said pins.

8. An apparatus of the class described, comprising a casing having a transverse support therein, a vertically movable member having a vertically sliding connection with said support and extending above and below the same, a hood mounted on said member above said casing, means for normally forcing said member and said hood upwardly and for holding them in a raised position, and a locking device having a pivotal connection with said hood and extending below said support, said support being provided with pins and the said locking device with teeth adapted to engage said pins and a tension device to draw the said locking device toward the said support.

9. An apparatus of the class described, comprising a casing or flue having therein a transverse support, a vertically movable member having a vertically sliding connection with said support and extending above and below the same, a hood mounted on said member above said casing or flue, and a locking device pivotally connected with said movable parts within said hood and extending below said support said support being provided with stop devices and said locking device provided with teeth adapted to engage said stop devices of said support.

In testimony that I claim the foregoing as my invention I have signed my name in presence of the subscribing witnesses this 31st day of December 1910.

WILLIAM J. LINDEMEYER.

Witnesses:

C. E. MULREANY,

E. G. BROMLEY.

---

Copies of this patent may be obtained for five cents each, by addressing the "Commissioner of Patents, Washington, D. C."